United States Patent [19]

Vaseen

[11] 4,258,700
[45] Mar. 31, 1981

[54] SOLAR OR WASTE HEAT-EXOTHERMIC/ENDOTHERMIC LIQUID-HEAT SINK AND PUMP

[76] Inventor: Vesper A. Vaseen, 9840 W. 35th Ave., Wheatridge, Colo. 80033

[21] Appl. No.: 44,966

[22] Filed: Jun. 4, 1979

[51] Int. Cl.³ .................. F24J 3/02; F28D 15/00; F04B 19/24
[52] U.S. Cl. .................. 126/433; 126/434; 165/105; 417/52; 417/92
[58] Field of Search .......... 126/434, 417, 432, 433; 165/105; 417/52, 92, 53, 207, 209

[56] References Cited

U.S. PATENT DOCUMENTS

| 45,168 | 11/1864 | Mowbray | 417/92 |
|---|---|---|---|
| 1,425,174 | 8/1922 | Cartter et al. | 126/434 |
| 1,686,887 | 10/1928 | Van Hise | 417/52 |
| 2,688,922 | 9/1954 | Bonaventura et al. | 417/52 |
| 2,688,923 | 9/1954 | Bonaventura et al. | 126/417 |
| 2,841,323 | 7/1958 | Lindenblad | 417/52 |
| 2,973,715 | 3/1961 | MacCracken | 417/52 |
| 3,814,545 | 6/1974 | Waters | 417/92 |
| 3,938,335 | 2/1976 | Marwick | 417/92 |
| 4,059,126 | 11/1977 | Nickerson | 417/52 |
| 4,165,952 | 8/1979 | Bennett | 417/53 |

FOREIGN PATENT DOCUMENTS

| 2413255 | 7/1975 | Fed. Rep. of Germany | 126/434 |
|---|---|---|---|
| 1300401 | 12/1972 | United Kingdom | 417/52 |

*Primary Examiner*—Daniel J. O'Connor

[57] ABSTRACT

Many acids, bases and the familys of liquid chemicals which are exothermic when mixed with water, and are reversible as endothermic are usable as "heat sinks" to store solar and waste heat energy. Selection of a liquid combination of any of these which when heated releases some or all the water provides a means of producing a "heat sink" for storage of solar or waste heat energy. The confined evaporation of the water produces a pressure which is used to move a piston thus moving a column of liquid being pumped. Moving the column of cool liquid through a condenser then reduces the temperature and pressure which in turn withdraws the piston so it can do additional work, as well as heats the column of pumped water.

1 Claim, 2 Drawing Figures

SOLAR OR WASTE HEAT-EXOTHERMIC/ENDOTHERMIC LIQUID-HEAT SINK AND PUMP

INTRODUCTION

Many uses of solar and waste heat energy are involved with moving liquids from one locality to another oftentimes at different levels in elevation. Also many uses of solar and waste heat energy are involved with transferring heat from solar or heat exchanger accumulators to point of use. The apparatus of a solar or waste heat pump which both stores heat collected from solar or waste heat source and uses the heat energy to move the heat to point of use is the purpose of this invention.

Uses are many, such as both heating and recirculating through a swimming pool, the water therein; or heating household water and elevating it to a higher elevation.

HISTORICAL AND DESCRIPTION OF PRIOR ART

A staggering potential market for solar and waste heat powered pumps exists when one realizes over 67,000,000 households in the United States depend on wells or springs for their potable water. Each of these households has an internal need to heat part of this water for domestic use.

Most solar and waste heat energy pumping systems have been researched and developed on the theory of either using a heat engine; such as the "Stirling", "Quasi-Stirling", "Eckhardt Free Piston Stirling"; "Beale Free Piston" Engines and others; to drive the pump or use windmill direct drive pumps.

Heat from solar and waste heat energy collectors has been stored in various specific heat gases, liquids, and solids, as well as combinations thereof, but not for use as converted to mechanical energy, except as steam. (Produced direct and by heat exchanger).

Solar and waste heat pumps have been used which use the thermals or differential specific gravities of hot vs. cold liquids, or gases to produce motion of the heat from one place to another. This is a very limited pumping or fluids moving mechanism.

Electric power has been generated using steam from solar furnaces and waste heat exchangers to drive generators, and also from direct electric power conversion from solar cells. The electric power then used to drive electric or steam motive pumps.

SUMMARY OF INVENTION

This invention teaches the art and science of converting solar and waste heat energy into both heat and mechanical energy in a separate liquid system in the same apparatus, at the same time.

Strong sulphuric acid, for example, when water is added to it, produces exothermic heat of solution. Reversibly when heat is applied to dilute sulphuric acid, the water is evaporated off leaving strong acid. This thermodynamic phenomena occurs with many acids, bases, and other liquid chemical combinations.

A number of inert liquids are available such as halogenated hydrocarbons which are impervious to these chemical actions such as strong $-66°$ Be, or "Fuming" sulphuric and are thus available due to their nonmiscibility with water, for use as a liquid piston to pump the water.

A mechanical free floating piston or diaphram can be placed between the chemical liquid and the liquid being pumped, but preferably it is an inert liquid.

The apparatus consists of a heating coil or plate system (3)(13) whereon solar or waste heat energy is concentrated to produce a temperature which will evaporate the water within the, in this example, dilute sulphuric acid and produce steam under pressure in the heating loop and appurtenent apparatus.

The steam pressure forces the inert liquid piston to move, from positions (16-17) to (18-19); thus pushing a column of cold water or other liquid through the pipe system (7) which uses the cold water from reservoir (1) to condense steam in the condenser (9), as the cold water is heated by heat exchange system (10) thus producing hot water (8) for use.

The condensate in the condenser drains (14) to the return piping (5) where it is divided to flow into the acid reservoir (6) and/or returns to the solar heated coil or plate system (23). The cooling of the steam in the condenser (27) by the pulse of cold water, reduces the pressure in the condenser thus returning the inert liquid piston from (19-18) back to its original position (17-16) at the same time with water discharge check valve (11) closed, thus bringing a volume of water or other liquid from the cold water reservoir (1) through the back flow prevention valve (11) and into pipe system (7) ready for the next evaporation cycle, steam pressure build up in the acid reservoir (6) and condenser/heat exchanger (27); caused by solar heating of the acid/water mixture in the heating piping (3) and the acid transfer piping (4).

The mixture of consensate water from the condenser (27) through pipe system (5) when intermixed with the sulphuric acid now concentrated by loss of water in previous heating cycles at (23) produces additional heat due to heat of solution and accelerates the heating to point of evaporation of the now diluted acid (23) to again evaporate the water to steam.

The steam replaces the liquid, acid water mixture in the heating coils or plates (3) with the steam stripped acid draining (26) back into the acid reservoir (6) for recycle through pipe system (4). Thus it is taught how solar or waste heat energy is applied to an apparatus and system which makes it possible to provide hot water as well as hydraulically/mechanically pump it to point of use (8).

Although sulphuric acid has been used by way of example; many acids, bases, and other liquids react similarly to sulphuric acid. The summary uses water by way of example of liquid pumped, but this could by any liquid.

PREFERRED EMBODIMENT

Figure 1:
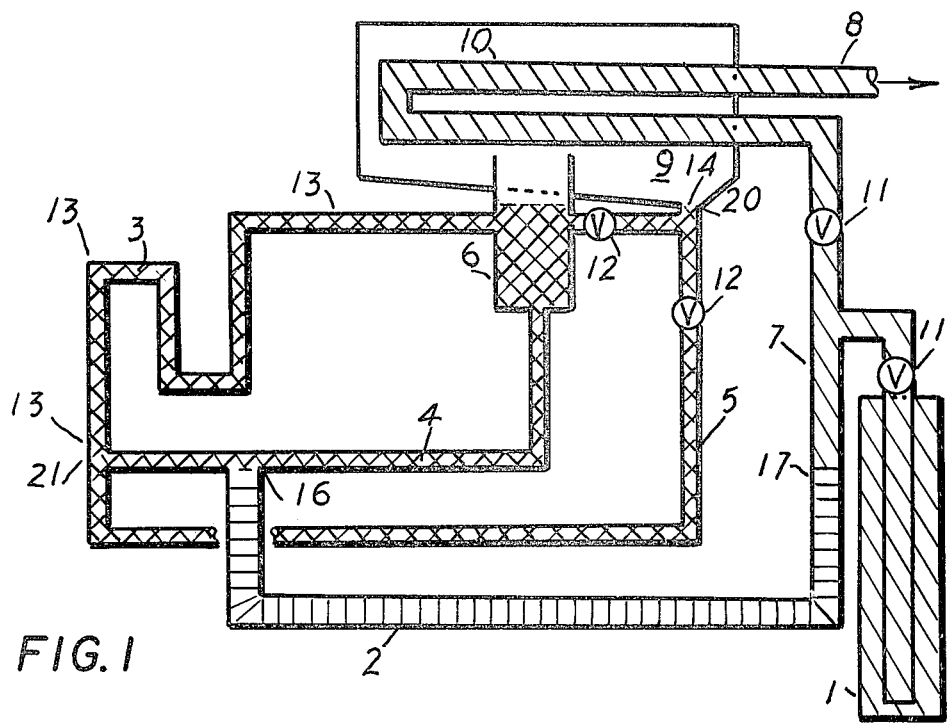
FIG. 1 represents the system at rest prior to heat energy having been added to the heat sink liquid (for example, sulphuric acid and water).
Figure 2:
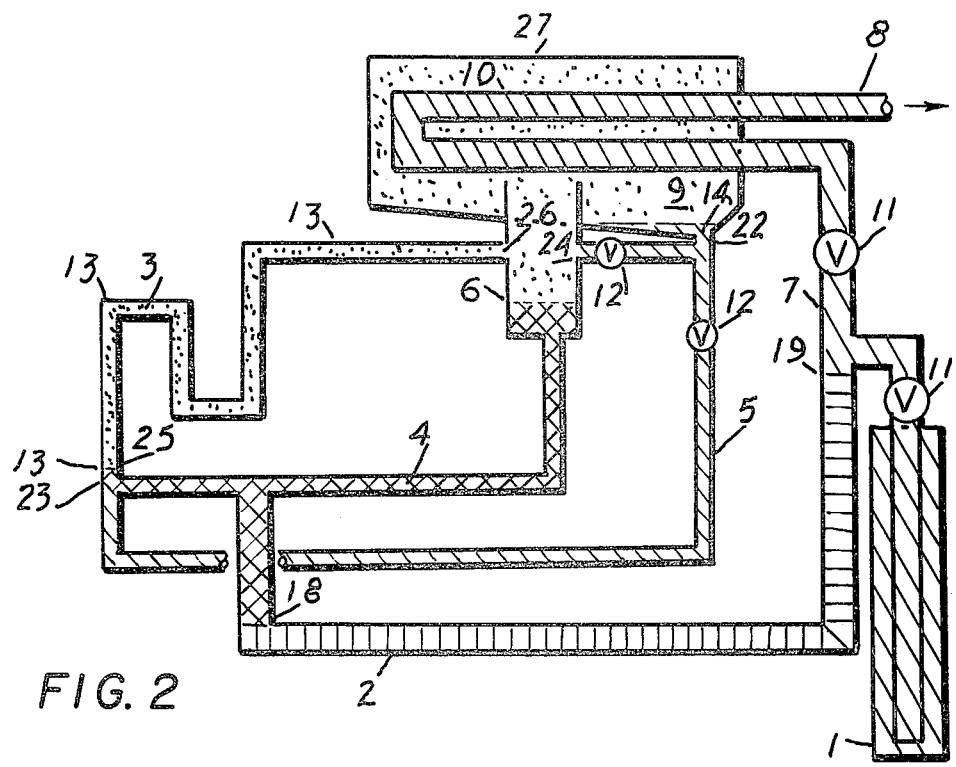
FIG. 2 represents the system with heat energy absorbed into the heat sink liquid, for example, with the water evaporated out of the now concentrated sulphuric acid, and its expanded volume requirement having produced a displacement of the liquid piston, producing a similar displacement of the exterior of the system liquid, thus a pumping action.

The art and science of converting solar and waste heat energy to both heat and mechanical energy in the same apparatus is taught hereafter using sulphuric acid as the heat sink and water as the liquid pumped. The example is used to teach the art and science of the reactions taking place within the apparatus; which can use as a heat sink many acids, bases and the whole family of aqueous liquid chemical compounds which are exothermic upon heat of solution and endothermic upon heat of evaporation and are reversible either way. The example further uses water as the pumped liquid, whereas it could be any liquid meeting the specifications of a specifically designed system.

By way of example a gallon of water is to be moved, each cycle of the apparatus through the system, and heated from, for example 50° F. on the cold side, to 80° F. on the warm side: For instance swimming pool water.

The rate of pumping or moving the water through the system depends on the input of concentrated or collected solar or waste heat energy to the heating plate (13) or heating loop (13) of the system. For example heat energy applied, as from either a solar collector or waste heat exchanger, of 205 BTU per minute will produce a system pumping 1-GPM. In like manner 102.5 BTU per minute will pump ½ GPM and 410 BTU per minute will pump 2 GPM.

The pumping rate established of 1 GPM with 205 BTU per minute of input heat energy requires for example a piston (2) which will displace 1 gallon of water (1) or other liquid being pumped. Preferably, when using sulphuric acid as the heat sink, the piston is an inert liquid of the halogenated hydrocarbons, having at least eight carbon atoms, a low volatility, non miscible with water (or the liquid being pumped) and stable within the operating temperature range ambient to 400° F. of the system.

The heat sink liquid components of piping (4)(5) and reservoir (6) are sized to fill the piping system to the level of the condenser drain (14)(20). For example a system composed of 60% to 70% by weight sulphuric acid; that is 48.2° Be to 55.6° Be acid, contains 0.2466 pounds of water and 0.3220 pounds of 66° Be sulphuric acid. (0.5686 pounds of 57% acid).

Addition of 205 BTU of heat energy to the heating coils (13) and the sulphuric acid/water liquid to, for this example, a maximum temperature of 300° F., which is 5° F. above the boiling point for 50° Be acid, evaporates 0.1733 pounds of water. The 0.1733 pounds of water flash to steam in the condenser chamber (9) occupying 231 cubic inches of volume at 300° F. and produce a pressure of 67.013 apsi.

When the total of 205 BTU has been absorbed by the acid/water liquid in the evaporation piping (3) and the water has water evaporated out of the 57% acid to residual a 70% acid content, the pressure of the steam in the condenser chamber (9) causes the 70% acid to move against the inert liquid piston (16) moving the inert liquid an equal volume to that of the steam in the condenser chamber (9), thus with a 1 gallon design, for example, moving 231 cubic inches of inert liquid. The piston (16)(17) pipe (2) diameter or other crossectional area, for example of 2.5" I.D. with a length of 48 inches, relieves the expansion of the water evaporated out of the 65% acid, as steam in the condenser chamber (9) and moves the inert liquid piston (2) by means of the remaining 50% acid which displaces the inert liquid piston (2). The inert liquid piston displaces in turn the equal volume of water in, for example 48" of 2.5" I.D. pipe (17) to (7) against a closed check valve (11) at the cold water source reservoir (1) when at the same time opening the check valve (11) in the water discharge piping system (8).

The cold water, for example at 50° F. is pushed through the heat exchanger piping (10) in the condenser, absorbing the 205 BTU of energy from the steam therein, thus heating the water discharged (8) to, for example, 80° F. The removal of the 205 BTU of heat energy in the condenser, reduces the temperature to for example 180° F. which condenses 0.1733 pounds of steam to water, which at the same time reduces the pressure to sub atmospheric. The lowered pressure pulls the liquid piston (2) from (7) to (17) thus moving the inert liquid piston to same position (16)(17) as at beginning of pumping cycle. The reverse motion of the liquid piston from (7) to (17) closes check valve (11) in the cold water discharge piping and opens check valve (11) from the cold water reservoir source (1) thus filling the water piping system (7) to (17) with 231 cubic inches of cold water ready for next pumping cycle.

The example has been presented as a means of illustrating the use of a heat sink consisting of a liquid with an exothermic heat of solution, and endothermic heat of evaporation; along with a liquid which produces this effect, for this example, 60%–70%, sulphuric acid and water. Those versed in the chemistry and physics of such chemical solutions will have no difficulty selecting a pair of liquids specific for their design parameters.

Although the example was designed around a system of pumping with each cycle (1) one gallon of water; and heating it from 50° F. to 80° F., this was done for illustration purposes. Those versed with the chemistry and physics of such a system will have no difficulty in mechanically designing a system which pumps any desired quantity of fluid either as a liquid or gas, at any temperature differential desired, subject only to the input BTU design of the solar collector or waste heat supply.

While the invention has been described in a certain degree of particularity, it is understood that the disclosure has been made by way of example and that changes in kind of heat sink chemical solutions, detail of pump configuration as well as temperature and pressure ranges, may be made without departure from the spirit thereof.

What is claimed:

1. I claim a method which by use of solar heat or waste heat energy, both pumps and heats the liquid being pumped, consisting of the steps of;

providing a liquid composed of specific chemicals which is exothermic when added to water, and endothermic when the water is evaporated therefrom, placing said liquid in a closed reservoir and piping system, which has a means of being heated, by solar or by waste heat, thus not only storing the heat energy as latent heat in the liquid mixture of chemical liquid and water, but evaporating from the liquids mixture the water as steam, which in a closed controlled volume condenser causes and displaces in a separate piping system the steam volume equivalent of inert liquid, which acting as a piston, moves a column or pipe full of cold water of equivalent volume to an elevated location.

said cold water when being moved and elevated passing through the condenser-heat exchanger, condensing the steam to water which then reacts exothermally when remixed with the chemical solution,
the condensing of the water and its resultant mixing with the chemical liquid,
thus causing a reduced pressure in the closed system, which reverses the direction of the liquid piston,
thus the vacated piping volume which was previously vacated is then again filled with the liquid being pumped and as pumped heated,
thus repeating the cycle,
thus achieving the objective of intermittantly pumping and heating a mixture of liquid chemicals and water.

* * * * *